(12) United States Patent
Pastor

(10) Patent No.: US 9,199,724 B2
(45) Date of Patent: Dec. 1, 2015

(54) SYSTEM AND METHOD FOR PERFORMING AN AIRCRAFT AUTOMATIC EMERGENCY DESCENT

(71) Applicant: HONEYWELL INTERNATIONAL INC., Morristown, NJ (US)

(72) Inventor: Peter Pastor, Brno (CZ)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 239 days.

(21) Appl. No.: 13/894,556

(22) Filed: May 15, 2013

(65) Prior Publication Data

US 2014/0343761 A1 Nov. 20, 2014

(51) Int. Cl.
*G05D 1/00* (2006.01)
*B64C 13/18* (2006.01)
*G05D 1/06* (2006.01)

(52) U.S. Cl.
CPC .............. *B64C 13/18* (2013.01); *G05D 1/0607* (2013.01)

(58) Field of Classification Search
None
See application file for complete search history.

(56) References Cited

U.S. PATENT DOCUMENTS 3,750,166 A * 7/1973 Dearth ............................ 342/30
7,792,615 B2 9/2010 Aimar
7,925,394 B2 4/2011 Deker et al.
2007/0129855 A1 6/2007 Coulmeau
2008/0039988 A1* 2/2008 Estabrook et al. .............. 701/14
2011/0021234 A1* 1/2011 Tibbitts et al. ................ 455/517
2014/0084817 A1* 3/2014 Bhavaraju et al. ............ 318/139
2014/0309821 A1* 10/2014 Poux et al. ...................... 701/14

OTHER PUBLICATIONS

Meuleau, N. et al.; An Emergency Landing Planner for Damaged Aircraft, Intelligent Systems Division NASA Ames Research Center; Proceedings of the Twenty-First Innovative Applications of Artificial Intelligence Conference 2009, CA.
Meuleau, N. et al.; A Comparison of Risk Sensitive Path Planning Methods for Aircraft Emergency Landing, Intelligent Systems Division NASA Ames Research Center, CA.

* cited by examiner

*Primary Examiner* — Adam Alharbi
(74) *Attorney, Agent, or Firm* — Ingrassia Fisher & Lorenz, P.C.

(57) ABSTRACT

A system and method automatically control an emergency descent of an aircraft to a target altitude. Factors including weather, traffic, terrain, special use airspace, distance to an alternate, time above 10,000 feet, and time airborne are considered in deciding on descent airspeed, aircraft heading, and selection of an alternate. The target altitude may be redefined after activation of a Terrain Advisory and Awareness System. A vertical speed, or rate of descent, may be adjusted after receiving a resolution advisory from a traffic clearance and avoidance system if the maneuver with maximum operating speed generates excessive normal acceleration. Initiation of the emergency descent will be transmitted via radio and data link communication and automatic selection of a mode declaring a state of emergency on the traffic clearance and avoidance system.

16 Claims, 8 Drawing Sheets

SYSTEM AND METHOD FOR PERFORMING AN AIRCRAFT AUTOMATIC EMERGENCY DESCENT

TECHNICAL FIELD

The exemplary embodiments described herein generally relate to aircraft operations and more particularly to aircraft emergency descents.

BACKGROUND

There have been incidents where pilots lose consciousness after suffering decompression resulting in asphyxia and the autopilot maintains the aircraft at the selected altitude. Some business jets are equipped with an automatic emergency descent mode activated after increasing of cabin altitude above a certain level. However, the pilot determines the final descent altitude and the most suitable direction for commencement of descent in known applications based on terrain and local pressure and temperature deviations from standard conditions.

Accordingly, it is desirable to provide a system and method for automatically initiating an emergency descent upon sensing a loss in cabin pressure, and determining the optimum descent track and target altitude. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for automatically control an emergency descent of an aircraft to a target altitude. Factors including, for example, weather, traffic, terrain, special use airspace, distance to an alternate, time above 10,000 feet, and time airborne are considered in deciding on descent airspeed, aircraft route, and selection of an alternate.

In an exemplary embodiment, a method for controlling an emergency descent by an aircraft, comprises activating an autopilot to initiate the emergency descent; determining an airspeed for the aircraft to maintain in the emergency descent; categorizing potential hazards in the vicinity of the aircraft, wherein the hazards are selected from at least one of the group consisting of other aircraft; weather; time above 10,000 feet; estimated time to the alternate; terrain; and special use areas; identifying a flight path, which either avoids the potential hazards or which is the least risky in view of the potential hazards; transmitting a message conveying the initializing of the emergency descent by at least one of the actions selected from the group consisting of an automated voice message; a 7700 squawk and ident; and a data link electronic message; configuring the aircraft for the emergency descent; and commanding the aircraft to fly the airspeed and the flight path by the autopilot.

In another exemplary embodiment, a method for controlling an emergency descent by an aircraft, comprises activating an autopilot to initiate the emergency descent; determining an airspeed for the aircraft to maintain in the emergency descent; categorizing potential hazards in the vicinity of the aircraft; identifying a flight path which is the least risky in view of the potential hazards; transmitting a message conveying the initializing of the emergency descent; configuring the aircraft for the emergency descent; and commanding the aircraft to fly the airspeed and the flight path by the autopilot.

In yet another exemplary embodiment, a system for controlling an emergency descent by an aircraft comprises a terrain database configured to store terrain elevation; a navigation system configured to provide navigational data; a flight management system configured to manage aircraft flight, and including an autopilot system; a sensor system configured to aircraft flight parameters; a data link unit configured to transmit signals; a processor coupled to each of the terrain database, the navigation system, the flight management system, the sensor system, and the data link unit, and configured to activate an autopilot to initiate the emergency descent; determine an airspeed for the aircraft to maintain in the emergency descent; categorize potential hazards in the vicinity of the aircraft, wherein the hazards are selected from one of the group consisting of other aircraft; weather; time above 10,000 feet; estimated time to the alternate; terrain; and special use areas; identify a flight path, which either avoids the potential hazards or which is the least risky in view of the potential hazards; transmit a message conveying the initializing of the emergency descent by at least one of the methods selected from the group consisting of an automated voice message; a 7700 squawk and ident; and a data link electronic message; configure the aircraft for the emergency descent; and command the aircraft to fly the airspeed and the flight path by the autopilot.

BRIEF DESCRIPTION OF THE DRAWINGS

The present invention will hereinafter be described in conjunction with the following drawing figures, wherein like numerals denote like elements.

DETAILED DESCRIPTION

Figure 1:
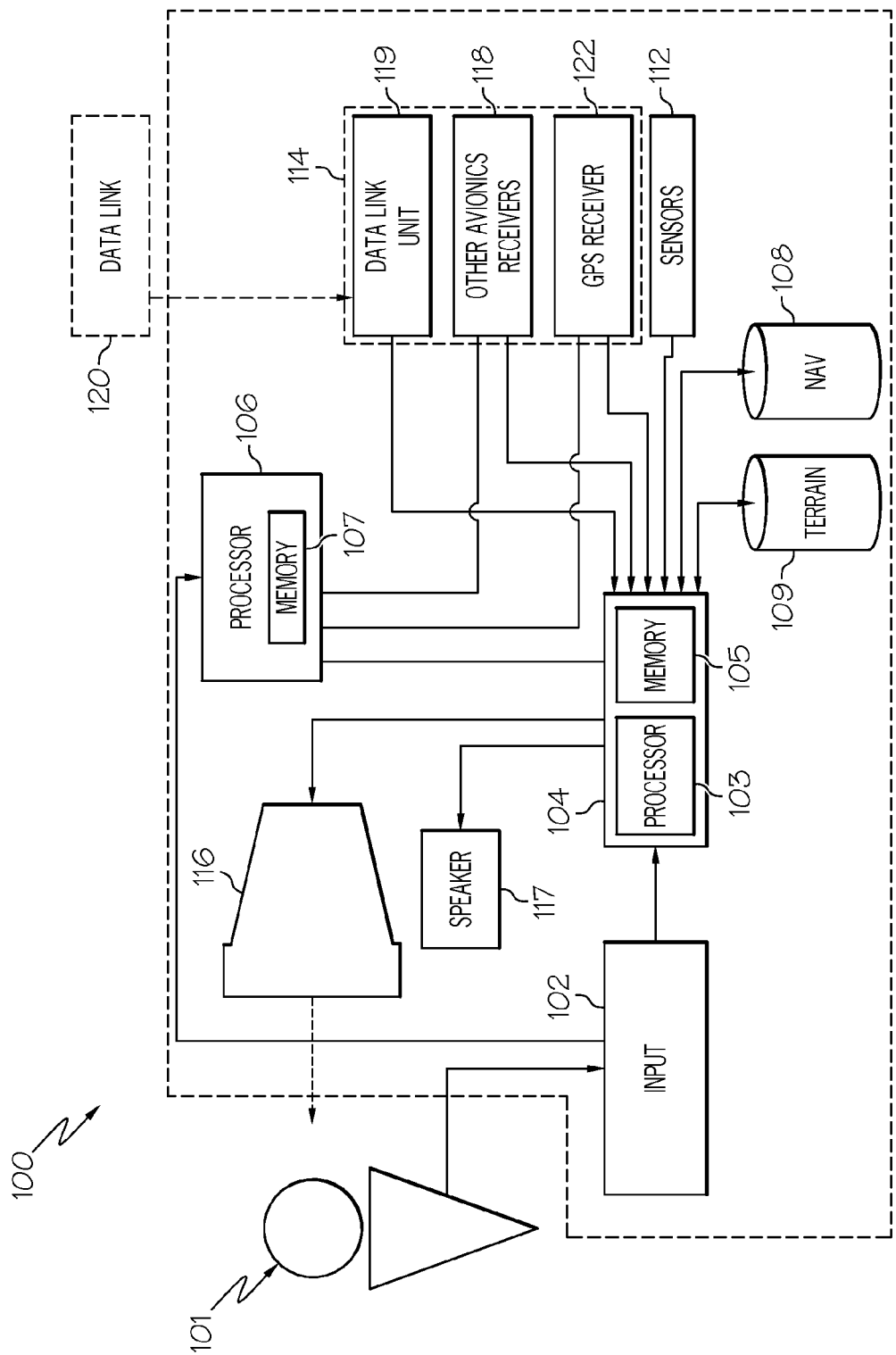
FIG. 1 is a block diagram of a known display system suitable for use in an aircraft in accordance with the exemplary embodiments described herein.
Figure 2:
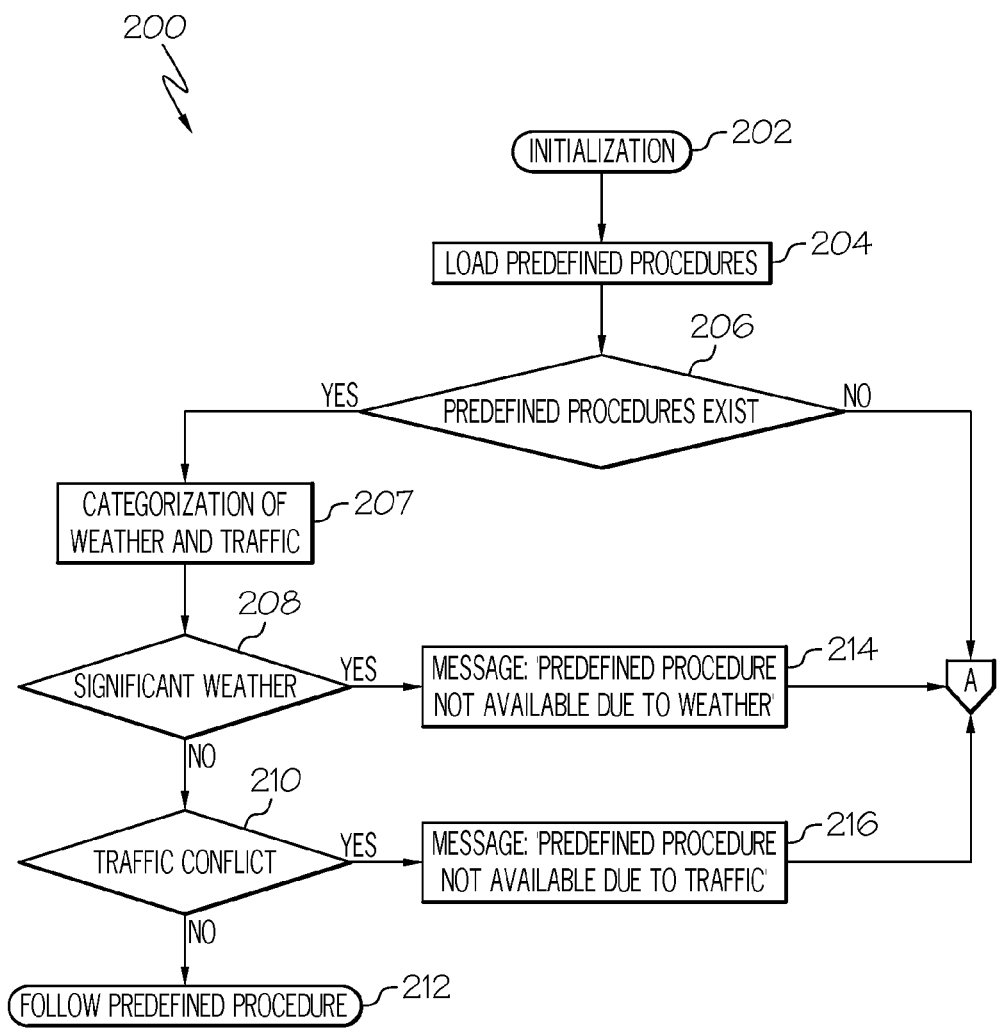
FIGS. 2-8 are a flow diagram of an exemplary method suitable for use with the display system of FIG. 1.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The mapping methods described herein may be used with a variety of aircraft. The aviation environment is described herein as the exemplary embodiment and may include navigation from point to point. Generally a lateral profile display is presented in conjunction with the vertical profile presented herein. Various types of maps may be used for display on the lateral profile, for example, road maps, terrain maps, aviation maps, and topographical maps.

Some applications may require more than one monitor, for example, a head down display screen, to accomplish the mission. These monitors may include a two dimensional moving map display and a three dimensional perspective display. A moving map display may include a top-down view of the aircraft, the flight plan, and the surrounding environment. Various symbols are utilized to denote navigational cues, e.g., waypoint symbols, line segments interconnecting the waypoint symbols, and range rings, and nearby environmental features, e.g., terrain, weather conditions, and political boundaries.

Alternate embodiments of the present invention to those described below may utilize whatever navigation system signals are available, for example a ground based navigational system, a GPS navigation aid, a flight management system, and an inertial navigation system, to dynamically calibrate and determine a precise course.

Technologies and concepts discussed herein relate to an emergency aircraft descent system adapted, and method, for initiating and controlling the flight of an aircraft in an emergency situation. In accordance with the exemplary embodiments, an emergency descent is initiated either manually by an aircrew member, or by autopilot upon detection of a drop of cabin air pressure to an altitude of, for example, 14,000 feet. A maximum operating airspeed is obtained and maintained for the particular aircraft subject to certain exceptions discussed below. A determination of emergency descent track is based on the weather, traffic, and terrain in the direction of descent, and available alternate aerodromes. Presence of significant weather like thunderstorm clouds associated with severe turbulence, severe icing, and heavy precipitation is dangerous for aircraft penetration at maximum operating speed that is used during emergency descent. For example, flying through severe turbulence area could lead to damage of the aircraft frame. Turning towards high density traffic could cause a reduction of required separation and even risk of collision. Since weather and traffic risks during the emergency descent cannot be determined before flight, they are evaluated when the aircraft begins the emergency descent, for example, an unexpected decompression of the aircraft occurs. If the aircraft is flying over high mountainous terrain, e.g. the Alps, Himalayas, or Andes, the best decision for an emergency descent is to determine the shortest direction to exit the area of high terrain so a safe (higher oxygen density) altitude may be obtained. The determination of the nearest available alternate aerodrome is crucial over remote areas, such as oceans, because of limited amount of fuel on board and increased fuel consumption during flight at low altitude. Other factors affecting the route of emergency descent are special use airspaces, required procedures in certain areas, e.g. Oceanic Airspace, and procedures predefined by management supervising the operation of the aircraft. An aircraft performing an emergency descent needs to attract attention of air traffic control (ATC) and other aircraft by transmitting, preferably automatically, an emergency message, e.g., squawking 7700 ident and transmitting an emergency message via radio and data link communication.

The exemplary embodiments select, in part, the safest track and altitude during emergency descent to avoid significant weather, traffic, hazardous terrain and any other potential dangers. The emergency aircraft descent system could be a part of automatic flight control system or could be designed as a separate unit. Track/Heading and altitude commands are sent to the autopilot that controls the aircraft by engaging corresponding functionality of the automatic flight control system (AFCS), e.g., Level Change (LVL CHG) for descent, Altitude Hold (ALT HLD) to maintain selected altitude, and Heading or Track hold (HDG/TRK) to maintain selected heading or track. The aircraft is controlled by the emergency aircraft descent system until a crewmember overtakes control by disengaging autopilot. The enhanced emergency descent (EED) algorithm described herein cooperates with other on board equipment, for example, weather radar, traffic collision and avoidance system (TCAS), emergency ground proximity warning system (EGPWS), and flight management system (FMS). The emergency aircraft descent system's functions may be divided, for descriptive purposes, into the following three modes: selection logic, safety, and alert messaging.

Selection logic is responsible for selection of the emergency descent route and avoidance of potentially dangerous areas. Weather radar provides data identified by color coding according to its intensity. Areas with heavy precipitations and severe turbulence are the most dangerous for aircraft descending at maximum operating speed. The EEDM system receives data about conflicting traffic from TCAS. Potentially conflicting traffic is traffic below the current level flight, at the current flight level and descend, or descending below the current flight level from above. Another criterion for selection of a descent route is data about high terrain received from the EGPWS. The main task of the emergency descent maneuver is to descend to 10000 feet or below in the shortest time. After successful descent, the aircraft should proceed to the nearest available alternate aerodrome. This is very crucial in extended operations (ETOPS) or in remote areas with a small number of available alternate aerodromes. Data about aerodromes and special use airspaces are stored in the FMS and provided to the EEDM.

The EED algorithm selects the emergency descent direction (aircraft heading) according to risk analyses by considering all factors. Predefined procedures provided by the aircraft operator, or entity responsible for operation of the aircraft is considered first before procedures selected by the EED algorithm, if there is no significant weather and high dense traffic for example. When there is significant weather and high dense traffic, the emergency aircraft descent system generates a message, for example, "PREDEFINED PROCEDURE NOT AVAILABLE DUE TO TRAFFIC/WEATHER" and the descent track will be determined by the selection logic. A prescribed procedure is a procedure prescribed by responsible authority in specific airspace. These prescribed procedures are defined more generally, e.g., for Oceanic Airspace—"leave the assigned route by initially turning at least 45 degrees to the right or to the left in order to acquire a same or opposite direction track offset 15 NM from the assigned track centerline". The selection algorithm will perform risk analysis. The aircraft will adhere to the prescribed track if the risk is small (below a predefined threshold).

The optional function is extension of spoilers, airbrakes or speed brakes immediately after initialization of emergency descent. The extension preferably does not adversely affect smoothness of the initial maneuver, prolong time to reach descent position or even exceed lower or upper airspeed limit. The spoilers, airbrakes or speed brakes will be deployed before reaching target altitude, or after activation of a terrain avoidance and warning system (TAWS) or receiving a resolution advisory from a traffic collision and avoidance system (TCAS). If the TAWS become inactive, the spoilers, airbrakes or speed brakes are retracted extended. After clear of the conflict, the aircraft resumes the descent rate for emergency descent and spoilers, airbrakes or speed brakes may be extended again.

The safety logic significantly decreases the possibility of collision with terrain or other aircraft. A TCAS resolution advisory (RA) during emergency descent will engage a vertical speed mode in the AFCS system and aircraft will maintain a vertical speed commanded by TCAS system. If the aircraft is descending to the selected altitude and is close to the terrain, EEDM will be able to redefine the target altitude if warning is received from the EGPWS in the following modes: excessive descent rate (Mode 1), excessive terrain closure rates (Mode 2A), and unsafe terrain clearance (Mode 4A).

Emergency descent commencement by an aircraft is very important information that needs to be known by ATC, pilots of other aircraft nearby, and the management supervising the operation of the aircraft. In accordance with the exemplary embodiment, a synthetic voice will be transmitted on an active frequency, emergency frequency, and other frequency/frequencies defined by management supervising the operation of the aircraft. Transmitted messages include identification of the aircraft and that automatic initialization of emergency descent has occurred. The TCAS system will transmit squawk IDENT and activate a squawk in mode A to 7700 (state of emergency). These messages are also transmitted via a controller-pilot data link communication (CPDLC). CPDLC may also transmit each heading change, TCAS RA, EGPWS warnings, the inability to follow predefined procedure, and penetration of certain airspaces.

The selection logic will be activated when cabin altitude reaches a predefined level, preferably 14,000 feet, and the aircraft is above defined altitude, e.g., 30,000 feet. These altitudes preferably will be defined by the aircraft manufacturer. The selection logic and emergency descent mode may be also activated manually (pilot initiated emergency descent), e.g., when suspecting a low oxygen environment, fire on board, or smoke in the cockpit. Autopilot disengagement will deactivate the emergency descent mode. The selection logic selects the heading/track to turn the aircraft. Heading/track is selected once during emergency descent in the front hemisphere and maximum three times in the rear hemisphere.

Target altitude is selected after selection of emergency descent route and is based on terrain data local temperature and pressure variation.

If it is not possible to avoid moderate/severe turbulence areas (identified by weather radar), the emergency aircraft descent system will automatically set the target airspeed to the turbulence penetration speed. This logic could be deactivated in higher altitude since it would be more important to quickly obtain a lower altitude and risk some damage to the aircraft frame. A TCAS RA during an emergency descent will engage the V/S mode. The selected airspeed may be adjusted to prevent excessive g maneuvers. After a 'Clear of Conflict' message is generated from TCAS, the descent with maximum operating speed is reengaged.

The aircraft will reduce airspeed approaching the final target altitude and will assume a lower predefined airspeed value, e.g. 250 knots, after reaching the final target altitude. If it is not possible to descent to the final target immediately (step descent), level flight above final target altitude will preferably be flown at speed at or close to maximum operating speed.

After activation of the EGPWS in Mode 1, Mode 2A or Mode 4A, the system will set the target altitude, engage climb/level change mode, and the set target speed to a speed with maximum climb gradient (Vx) if climb is initiated to avoid terrain. If both lateral, e.g., HDG/TRK, and vertical modes, e.g., LVL CHG, ALT HLD, are successfully engaged, the automatic message transmission described above is initiated. If a climb is not required, the aircraft will level off at the altitude where the EGPWS system is not active. A climbing aircraft will level off at the altitude where system deactivation occurs.

Referring to FIG. 1, an exemplary flight deck navigation system 100 is depicted and will be described for implementing the present invention. The system 100 includes a user interface 102, a navigation computer 104 (for example, an FMS), a processor 106, one or more navigation databases 108, one or more terrain databases 109, various optional sensors 112, various external data sources 114, and a display device 116. In some embodiments the user interface 102 and the display device 116 may be combined in the same device, for example, a touch pad. The user interface 102 is in operable communication with the FMS 104 and the processor 106 and is configured to receive input from a user 101 (e.g., a pilot) and, in response to the user input, supply command signals to the FMS 104 and the processor 106. The user interface 102 may be any one, or combination, of various known user interface devices including, but not limited to, a cursor control device (not shown), such as a mouse, a trackball, or joystick, and/or a keyboard, one or more buttons, switches, or knobs.

The FMS 104 may include one of numerous known general-purpose microprocessors 103 or an application specific processor that operates in response to program instructions. In the depicted embodiment, the FMS 104 includes on-board memory 105. The program instructions that control the processor 103 may be stored in the memory 105. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

The processor 106 operates to monitor and direct the navigation of the aircraft, and is coupled to the FMS 104, GPS receiver 122 and the other avionics receivers 118. The processor includes memory (107) for storing instructions (software) and data from the FMS 104, GPS receiver 122, and other avionics receivers 118.

The memory 105, 107 may be realized as RAM memory, flash memory, EPROM memory, EEPROM memory, registers, a hard disk, a removable disk, a CD-ROM, or any other form of storage medium known in the art. In this regard, the memory 105, 107 can be coupled to the processor 103, 106, respectively, such that the processors 103, 106 can be read information from, and write information to, the memory 105, 107. In the alternative, the memory 105 may be integral to the processor 103, and the memory 107 may be integral to the processor 106. As an example, the processor 106 and the memory 107 may reside in an ASIC. In practice, a functional or logical module/component of the navigation system 100 might be realized using program code that is maintained in the memory 107.

The processors 103, 106 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

No matter how the processor 103 is specifically implemented, it is in operable communication with the processor 106, the navigation databases 108, and the display device 116, and is coupled to receive various types of aircraft state data from the various sensors 112, and various other environment related data from the external data sources 114. The processor 103 is configured, in response to the inertial data and the avionics-related data, to selectively retrieve navigation data from one or more of the navigation databases 108, and to supply appropriate display commands to the display device 116. The display device 116, in response to the display commands from, for example, a touch screen, keypad, cursor control, line select, concentric knobs, voice control, and data link message, selectively renders various types of textual, graphic, and/or iconic information. The preferred manner in which the textual, graphic, and/or iconic information are rendered by the display device 116 will be described in more detail further below. Before doing so, however, a brief description of the databases 108, the sensors 112, and the external data sources 114, at least in the depicted embodiment, will be provided.

The terrain databases 109 include various types of data representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 109 and the navigation databases 108 are, for clarity and convenience, shown as being stored separate from the processor 104, all or portions of either or both of these databases 109, 108 could be loaded into the memory 105, or integrally formed as part of the processor 104. The terrain/taxiway databases 109 and navigation databases 108 could also be part of a device or system that is physically separate from the system 100.

The navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the navigation databases 108 are, for clarity and convenience, shown as being stored separate from the FMS 104, all or portions of either or both of these databases 108 could be loaded into the memory 105, or integrally formed as part of the processor 103, and/or memory 105. The navigation databases 108 could also be part of a device or system that is physically separate from the system 100.

The sensors 112 may be implemented using various types of sensors, systems, and or subsystems, now known or developed in the future, for supplying various types of aircraft state data. The state data may also vary, but preferably include data representative of the geographic position of the aircraft and also other data such as, for example, aircraft speed, heading, altitude, and attitude.

The number and type of external data sources 114 (or subsystems) may also vary, but typically include for example, a GPS receiver 122, other avionics receivers 118 including, for example, a VOR/ILS, and a data link unit 119. The other avionics receivers would include, for example, a terrain avoidance and warning system (TAWS), a traffic and collision avoidance system (TCAS), a flight director, and a navigation computer.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle.

The display device 116, as noted above, in response to display commands supplied from the processor 104, selectively renders various textual, graphic, and/or iconic information, and thereby supply visual feedback to the user 101 It will be appreciated that the display device 116 may be implemented using any one of numerous known display devices suitable for rendering textual, graphic, and/or iconic information in a format viewable by the user 101. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

In operation, the display device 116 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display device 116 is suitably designed to process data obtained from the sources of flight status data in the manner described in more detail herein. In particular, the display device 116 can use the flight status data of the host aircraft when rendering the SVS display.

Onboard data link 119 is coupled to an external data link 120 and is configured to transmit and receive data from ground stations and other aircraft. Examples of the data received include, for example, weather information, traffic information, route changes, and clearances and alerts (including NOTAMS). In accordance with the present exemplary embodiments, the onboard data link unit 119 transmits a messages related to the emergency descent.

It should be understood that FIG. 1 is a simplified representation of a system 100 for purposes of explanation and ease of description, and FIG. 1 is not intended to limit the application or scope of the subject matter in any way. In practice, the system 100 and/or aircraft 108 will include numerous other devices and components for providing additional functions and features, as will be appreciated in the art.

FIGS. 2-8 are a flow chart that illustrates an exemplary embodiment of a method 200 suitable for use with a flight deck system 100. Method 200 evaluates if it is possible to follow the predefined emergency descent procedure based on considering the presence of significant weather and possibility of collision with other aircraft. The various tasks performed in connection with method 200 may be performed by software, hardware, firmware, or any combination thereof. For illustrative purposes, the following description of method 200 may refer to elements mentioned above in connection with preceding FIG. 1. In practice, portions of method 200 may be performed by different elements of the described system, e.g., a processor, a display element, or a data communication component. It should be appreciated that method 200 may include any number of additional or alternative tasks, the tasks shown in FIGS. 2-8 need not be performed in the illustrated order, and method 200 may be incorporated into a more comprehensive procedure or method having additional functionality not described in detail herein. Moreover, one or more of the tasks shown in FIGS. 2-8 could be omitted from an embodiment of the method 200 as long as the intended overall functionality remains intact.

In accordance with the exemplary method of FIGS. 2-8, an evaluation of predefined procedure portion 200 of the algorithm includes initialization 202 after which the predefined procedures are retrieved 204 from a database. The initialization 202 may be accomplished manually by a pilot when deemed necessary, for example, when reduced cognitive ability is realized, or automatically upon a rapid drop in cabin pressure (altitude). If predefined procedures exist 206 and after categorization of weather and traffic is performed 207, if there is no significant weather 208 and no traffic conflicts 210, the predefined procedures are implemented automatically 212 by autopilot. Predefined procedures preferably would include initiating the descent, obtaining maximum airspeed, flying a safe flight path, determining a target altitude, for example, 10,000 feet if terrain is not a hazard, and reducing airspeed to preferably 250 knots while leveling at the target altitude. The algorithm proceeds to index A of FIG. 3 if the predefined procedures do not exist 206, if there is significant weather or a traffic conflict and messages 214, 216, for example, PREDEFINED PROCEDURE NOT AVAILABLE DUE TO WEATHER and PREDEFINED PROCEDURE NOT AVAILABLE DUE TO TRAFFIC, respectively, are provided to the appropriate ground station and optionally on the display 116.

The algorithm categorizes by level of risk (STEP 302), weather, traffic, terrain, time above 10,000 feet, and distance to an alternate landing location as follows, for example:

Weather
1. No color—no weather risk
2. green
3. yellow
4. red
5. magenta—high weather risk Traffic:
1. no possibility of collision/no traffic risk
2. normal traffic: proximate traffic between 2 and 5 NM (at least two targets) and other traffic with possibility of collision
3. heavy traffic/high traffic risk: at least two targets within 2 NM Terrain:
1. 0-5000 feet—low terrain risk
2. 5000-8000 feet
3. 8000-12000 feet
4. above 12000 feet—high terrain risk Normalized time above 10000 feet, $T_n=t_1+5t_2+15t_3$
where Tn is normalized time:
$t_1$ is time between FL150 and FL180—low risk
$t_2$ is time between FL180 and FL250
$t_3$ is time between FL250 and FL300—high risk Estimated time to an alternate airport (if available):
1. up to 30 minutes—low risk
2. between 30 minutes and 1 hour
3. between 1 hour and 2 hours
4. between 2 hours and 3 hours
5. more than 3 hours—high risk In general, the algorithm determines a sector for the flight path. Since weather radar typically is restricted to plus/minus 90 degrees from the heading of the aircraft, a flight path in either the left (minus) 90 degree sector or the right (plus) 90 degree sector is prioritized unless the flight is within 30 minutes of departure or an alternate airport not in those sectors is much closer. The aircraft will "turn back" if within 30 minutes of departure unless terrain is an issue.

Figure 3:
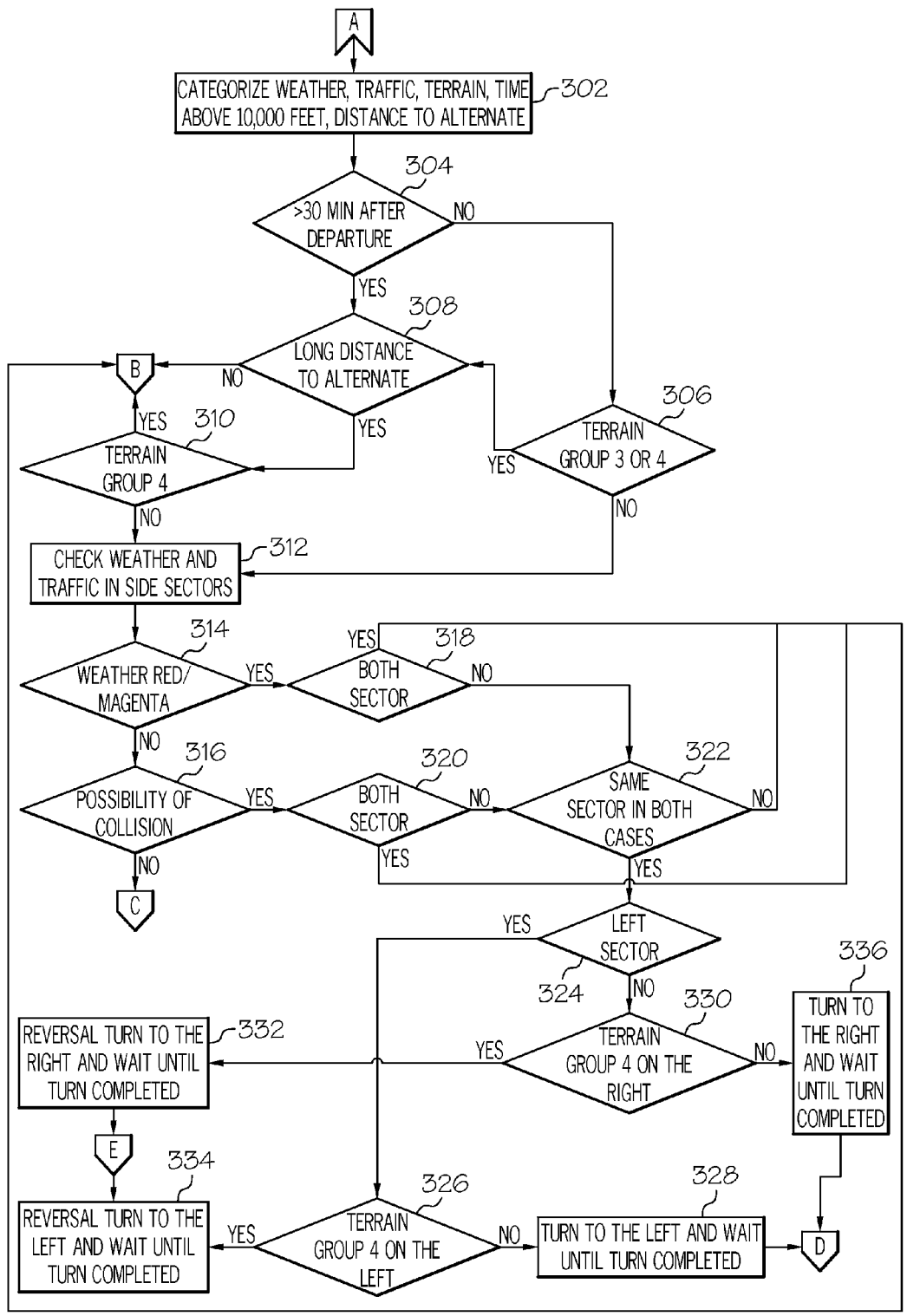

Referring to a hemisphere selection portion of FIG. 3, after the algorithm categorizes 302 the weather traffic, terrain, time, and distance, a determination 304 is made whether the flight time is greater than 30 minutes. If within 30 minutes, a determination 306 of the categorized terrain is made for the flight route back towards the point of departure. If the terrain is a high risk, for example, groups 3 and 4 (at or above 8,000 feet), and it is not a long distance to an alternate 308 landing area, the algorithm goes to index B of FIG. 4. If it is a long distance to the alternate 308, and the terrain is at the highest risk 310 (group 4), the algorithm proceeds to index B. If the terrain is not a high risk 306, 310 (not in group 3 and 4), the risk of weather and traffic in the side sectors is determined 312. If the weather 314 and traffic 316 are low risk, the algorithm proceeds to index C of FIG. 5. If the weather is high risk/risky, for example, red or magenta, for both sectors 318, the algorithm proceeds to index B in FIG. 3. If the traffic is high risk/risky 316 in both sectors 320, the algorithm proceeds to index B. If the weather and traffic are not risky in both sectors 318, 320, but they are different sectors 322, the algorithm proceeds to index B. However, if the left sector (alternatively could be the right sector) is not high risk/risky for weather and traffic 324, and the terrain is not high risk/risky 326, a left turn command is sent to the autopilot and when the left turn is completed 328, the algorithm proceeds to index D of FIG. 6. If the left sector is high risk/risky for terrain 326, a right turn command is sent to the autopilot 332. If the left sector is high risk/risky for terrain 326 (please note that in the right sector is significant weather or/and exist the possibility of collision with other aircraft) the airplane turn 180 degrees to the left (334), the algorithm proceeds to index E of FIG. 7. If the right sector is the same sector 324, and the terrain is not high risk/risky 330, a right turn command is sent to the autopilot and when the turn is completed, the algorithm proceeds to index D of FIG. 6. If the right sector is high risk/risky for terrain 330 (please note that in the left sector is significant weather or/and exist the possibility of collision with other aircraft) the airplane turn 180 degrees to the right (332), the algorithm proceeds to index E of FIG. 7.

Figure 4:
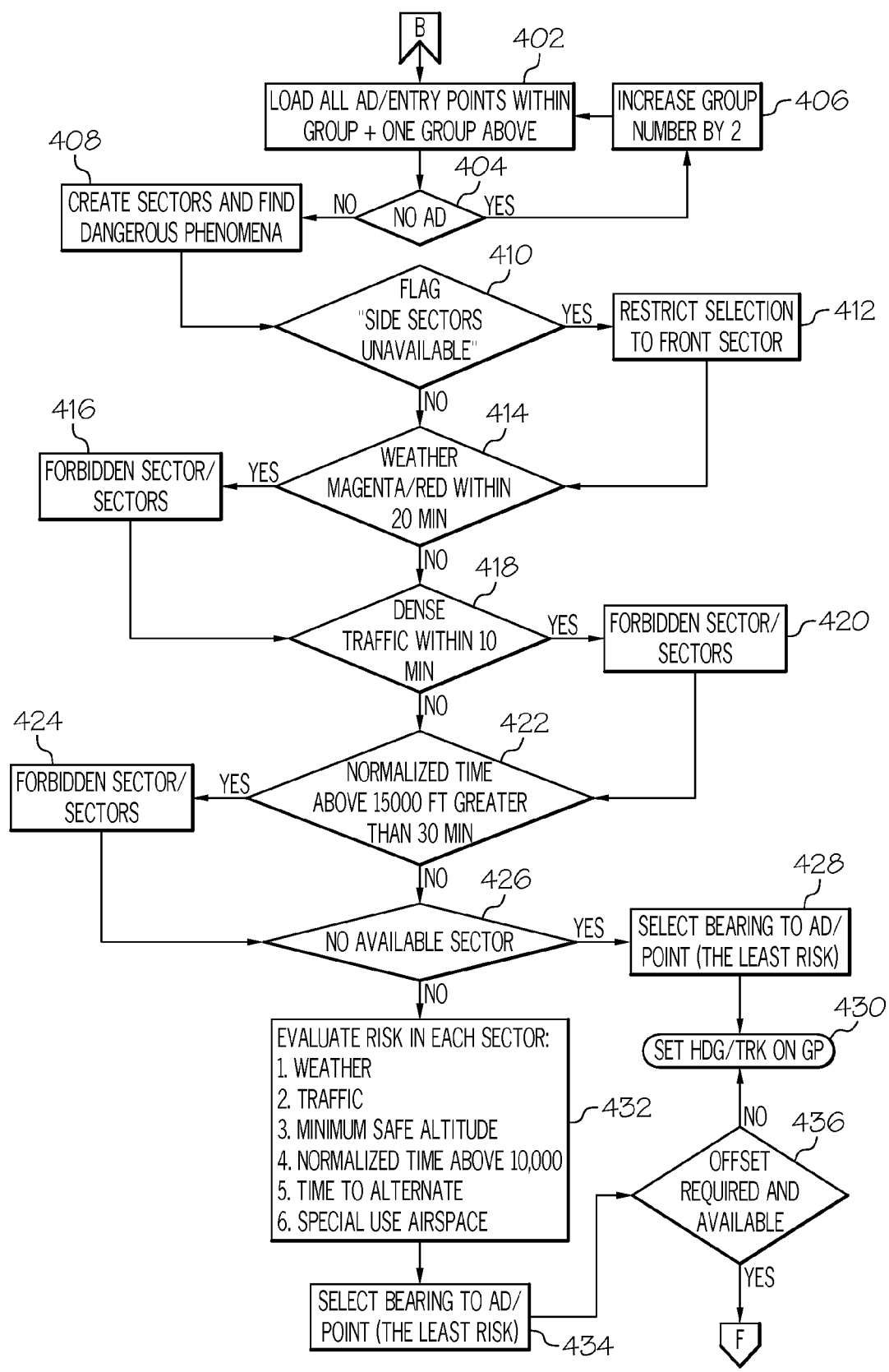

Referring to a front hemisphere portion of FIG. 4 after index B, all alternate destination entry points within the group plus one group (listing of estimated time to an alternate) are determined 402 from the navigation database. If there are no alternate destinations 404, the group number is increased 406 by 2, and step 402 is repeated. If there is an alternate destination 404, sectors are created 408 and risky issues are determined. If entry points to the alternate destination are not available in the database, points will be created on the TCA boundary. If the TCA boundary does not exist, points will be created on a 30 degree bearing to each side or within a distance of 25 NM from the alternate destination, whichever is greater. If side sectors are unavailable, the selection is restricted 412 to the front sector. If side sectors are available 410 or if the front sector is selected 412, and if the weather is risky 414 for the next 20 minutes, the sector is identified 416 as "forbidden". If the weather is not risky 414, but the traffic is heavy within the next 10 minutes 418, the sector is identified 420 as "forbidden". If traffic is not heavy 418, and if the normalized time above 15000 feet is greater 422 than 30 minutes, the sector is identified 424 as "forbidden". If the normalized time is less than 30 minutes 422, and no sector is available 426, a heading to the alternate destination with the least risk is selected 428, and the heading and track are commanded 430 by autopilot. If a sector is available 426, each sector is evaluated, by a weighted scale, for weather, traffic, minimum safe altitude, normalized time above 10,000 feet, time to alternate, and special use airspace. The heading and track to the alternate destination of least risk is selected 434, and if no offset is required or available 436, the heading and track are commanded 430 by autopilot. If an offset is required and available 436, the algorithm proceeds to index F in FIG. 8.

Figure 5:
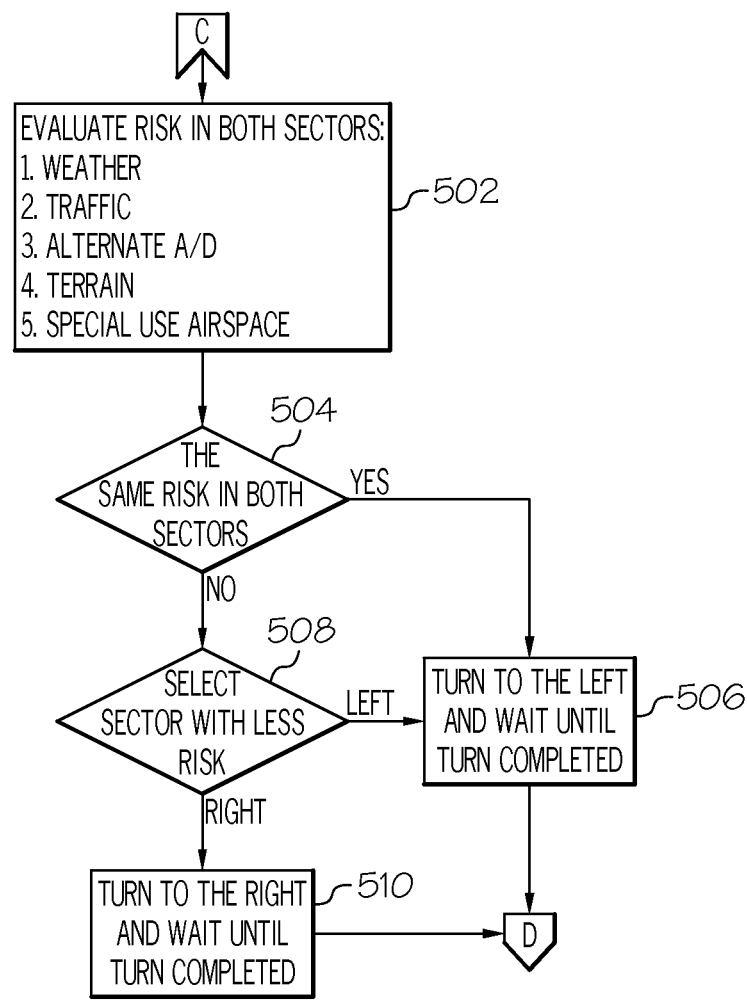

Referring to the side sector selection portion of FIG. 5 after index C, both sectors are evaluated 502 by a weighted scale for risk regarding weather, traffic, distance to an alternate destination, terrain, and special use airspace. If the risk is identical in both sectors 504, the autopilot commands the aircraft to turn to the left 506, and when the turn is completed, the algorithm proceeds to index D in FIG. 6. If the risk is not the same in both sectors 504, the sector with less risk is selected 508. If the right sector is selected 508, the autopilot commands the aircraft to turn to the right 510, or if the left sector is selected 508, the autopilot commands the aircraft to turn to the left 506. The algorithm then proceeds to index D in FIG. 6.

Figure 6:
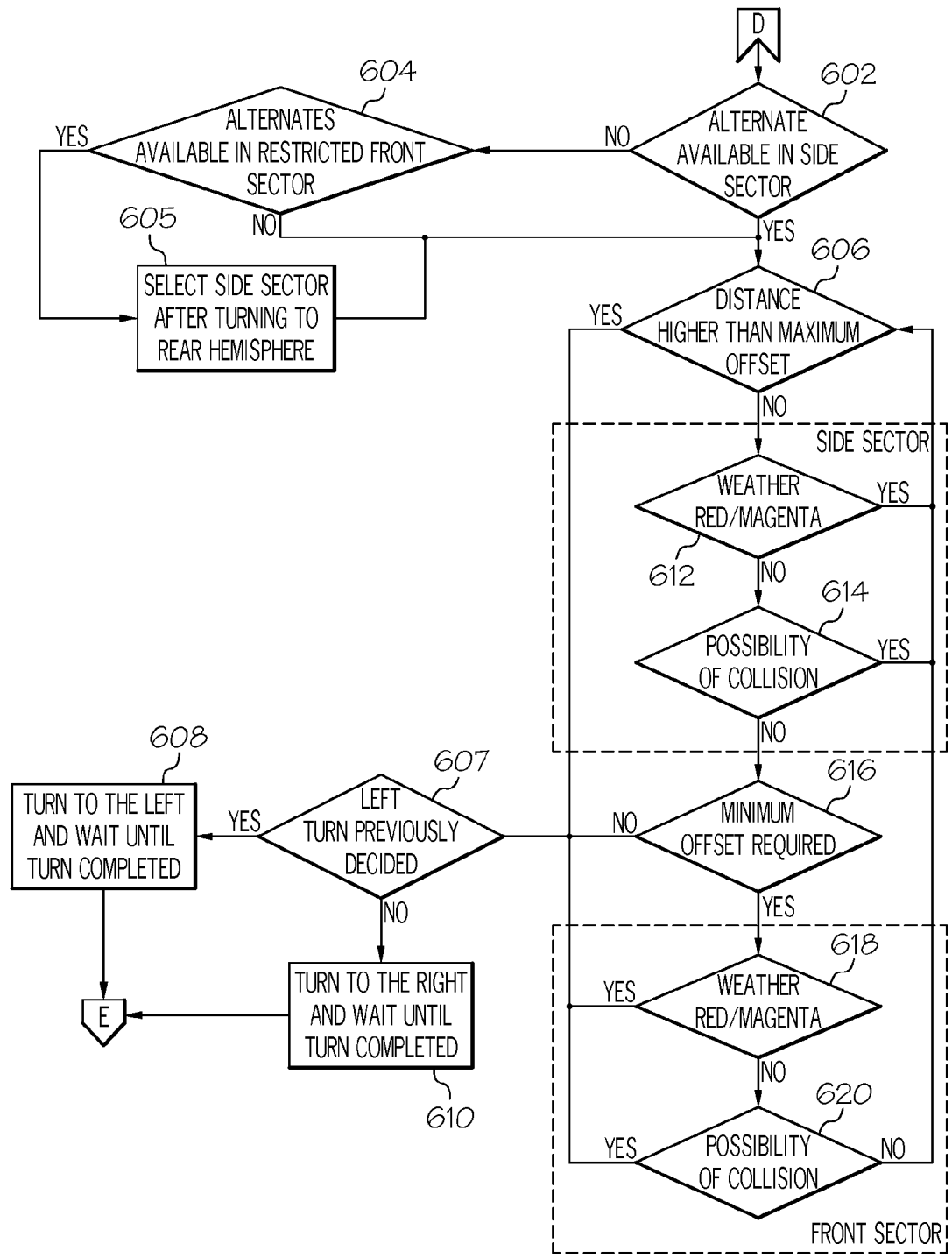

Referring to the turn to the rear hemisphere portion of FIG. 6 from index D, if an alternate is available in a side sector 602, or if not and whether an alternate is available in the restricted front sector 604, a determination is made whether the distance from flown track prior to initiation of the emergency descent is greater than the maximum offset 606. If alternates available in the restricted front sector were available 604, a side sector is selected after turning to the rear hemisphere 605 prior to proceeding to step 606. If the alternate(s) is available only in restricted front sector 604, this (these) alternate(s) is selected after completion of the turn to the rear hemisphere. If the distance is greater and a left turn had been decided, a turn to the left is completed 608, or a right turn is completed 610 if a right turn had been decided. If the distance to the alternate is not greater than the maximum offset 606, the weather 612 and possibility of collision 614 is not risky, a minimum offset is not required 616, and a left turn was previously decided upon 607, then the left turn is completed 608. If the left turn was not previously decided upon 607, the right turn is completed 610. If a minimum offset is required 616, and the weather 618 and the possibility of collision is not risky 620, the left or right turn is completed 608, 610. If the weather and possibility of collision are risky in steps 612 and 614, or if the weather and possibility of collision are not risky in steps 618 and 620, the algorithm returns to step 606.

Figure 7:
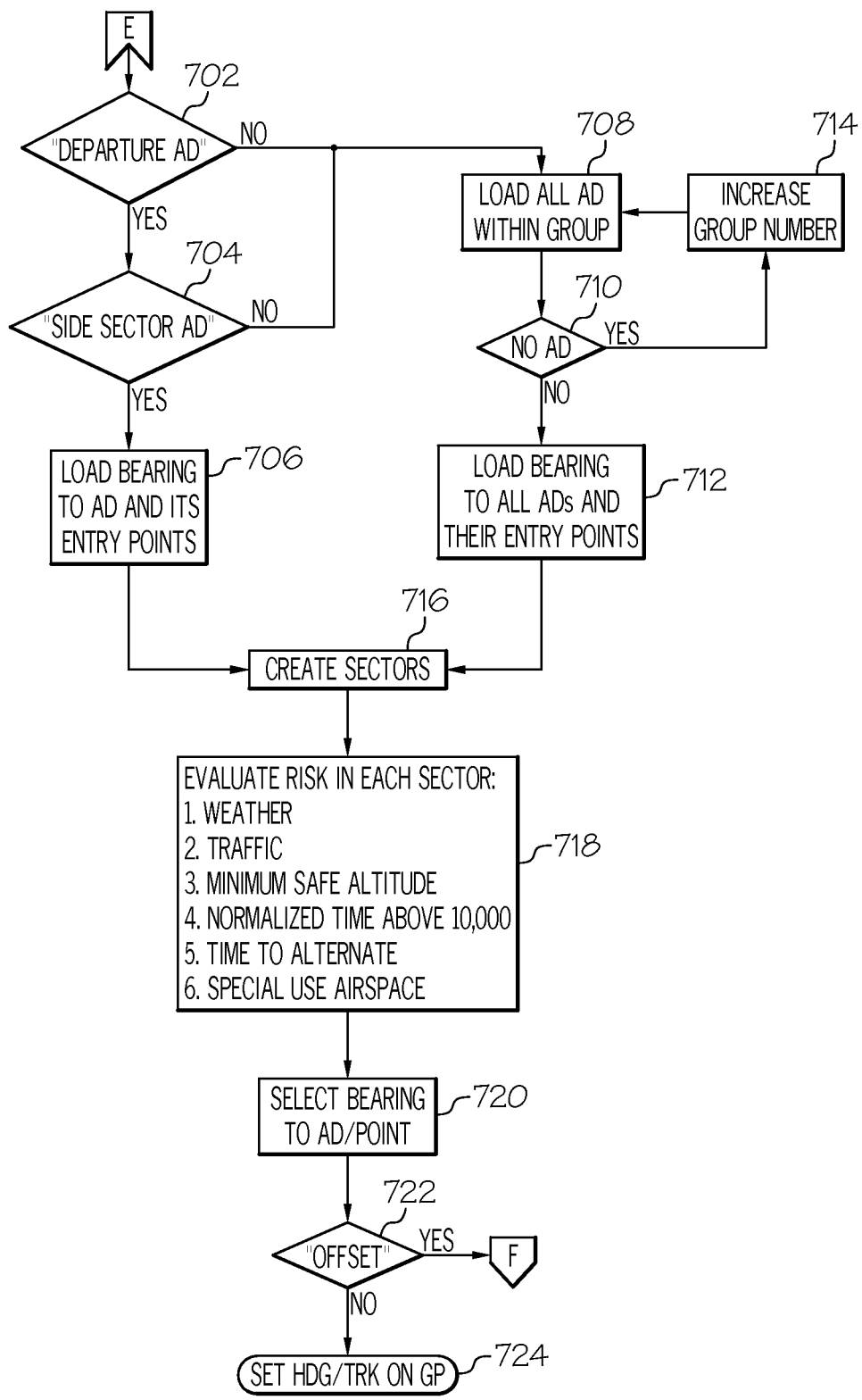

After the index E in the rear hemisphere portion of FIG. 7, if the departure airport 702 and a side sector 704 are designated for the alternate destination, the heading and entry points to the destination are identified 706. If either an alternate destination 702 or side sectors 704 have not been designated, all alternation destinations within a group are considered 708, and the heading to and the points of entry for a selected alternation destination 710 are identified 712. If an alternate destination cannot be designated 710, the number of alternate destinations is increased 714. Once the heading and points of entry have been identified 706, 712, sectors are created 716, each sector is evaluated 718 by a weighted scale for weather, traffic, minimum safe altitude, normalized time above 10,000 feet, time to alternate, and special use airspace. The heading and track to the alternate destination of least risk is selected 720, and if no offset is required or available 722, the heading and track are commanded 724 by autopilot. If an offset is required and available 722, the algorithm proceeds to index F in FIG. 8.

Figure 8:
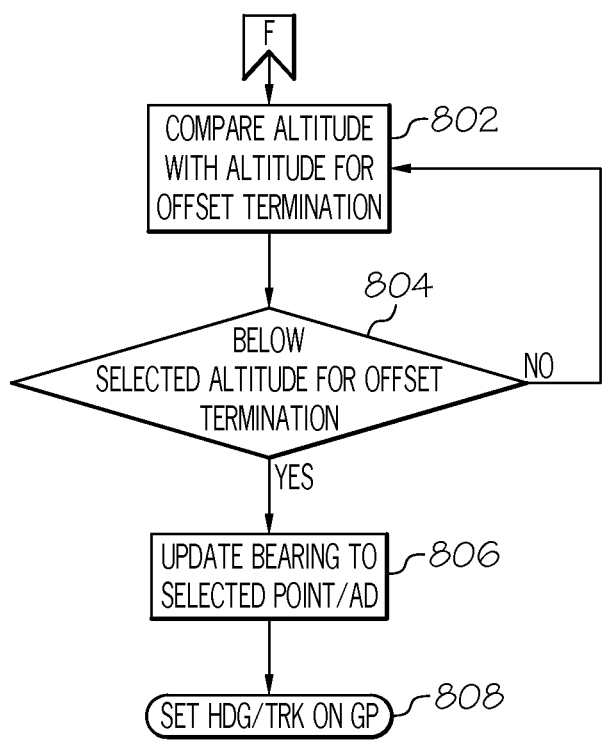

Referring to the offset track termination portion of FIG. 8 and following index F, a comparison 802 is made of the target altitude with the altitude for offset termination. If the target altitude is below the offset termination altitude 804, an update is made 806 to the heading and point of entry for the alternate destination, and the heading and track are commanded 808 by autopilot.

To briefly summarize, the methods and systems described above automatically control an emergency descent of an aircraft. Factors including weather, traffic, terrain, special use airspace, distance to an alternate, time above 10,000 feet, and time airborne are considered in deciding on descent airspeed, aircraft heading, and selection of an alternate.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for controlling an emergency descent by an aircraft, comprising:
    activating an autopilot in response to an occurrence of both (i) the aircraft is above a predefined altitude and (ii) a cabin altitude of the aircraft reaches a predefined level, to initiate the emergency descent;
    determining an airspeed for the aircraft to maintain in the emergency descent;
    categorizing potential hazards in the vicinity of the aircraft by assigning a level of risk to each potential hazard, wherein the potential hazards comprise:
        other aircraft;
        weather;
        time above 10,000 feet;
        estimated time to an alternate airport;
        terrain; and
        special use areas;
    identifying a flight path, which either avoids the potential hazards or which represents the lowest level of risk in view of the potential hazards;
    transmitting a message conveying the initializing of the emergency descent by at least one of the actions selected from the group consisting of:
        an automated voice message;
        a 7700 squawk and ident; and
        a data link electronic message;
    configuring the aircraft for the emergency descent; and
    commanding the aircraft to fly the airspeed and the flight path by the autopilot until a crewmember disengages the autopilot.

2. The method of claim 1 wherein determining the airspeed comprises:
    determining the maximum airspeed for the aircraft.

3. The method of claim 1 wherein determining the airspeed comprises:
    determining a turbulent airspeed for the aircraft if required by weather.

4. The method of claim 1 wherein configuring the aircraft comprises:
    extending spoilers on the aircraft.

5. The method of claim 1 wherein the transmitting a message comprises:
    transmitting a message upon entering a restricted zone.

6. The method of claim 1 wherein the determining a flight path further comprises:
    turning to a flight path in a rear hemisphere of the aircraft if within a designated number of minutes from takeoff.

7. The method of claim 1 wherein the determining a flight path further comprises:
    turning to a flight path in a front hemisphere as a priority.

8. The method of claim 1 wherein categorizing potential hazards further comprising:
    calculated a time at altitude weighted by altitude levels.

9. The method of claim 1 wherein the determining a flight path further comprises:
    providing the flight path even though the all of the potential hazards present a risk, the flight path assuming a path of least risk.

10. The method of claim 1 further comprising:
    determining one or more altitudes in the descent requiring the aircraft to temporarily remain at the altitude due to the potential hazards.

11. The method of claim 10 wherein determining one or more altitude comprises:
    determining the altitude upon activation of a terrain awareness and warning system.

12. The method of claim 11 wherein determining the airspeed comprises:
    determining a maximum gradient airspeed upon activation of a terrain avoidance and warning system.

13. The method of claim 1 wherein determining the vertical speed comprises:
    determining the vertical airspeed after receiving a resolution advisory from a traffic collision and avoidance system to avoid collision with other aircraft.

14. The method of claim 13 wherein determining the airspeed comprises:
    avoiding maneuvers that would cause acceleration to exceed a threshold after activation of the traffic collision and avoidance system.

15. The method of claim 1 further comprising:
    implement predefined procedures if weather and traffic are determined to be not risky.

16. A system for controlling an emergency descent by an aircraft, comprising:
    a terrain database configured to store terrain elevation;
    a navigation system configured to provide navigational data;
    a flight management system configured to manage aircraft flight, and including an autopilot system;
    a sensor system configured to aircraft flight parameters;
    a data link unit configured to transmit signals;
    a processor coupled to each of the terrain database, the navigation system, the flight management system, the sensor system, and the data link unit, and configured to:
        activate an autopilot in response to an occurrence of both (i) the aircraft is above a predefined altitude and (ii) a cabin altitude of the aircraft reaches a predefined level, to initiate the emergency descent;

determine an airspeed for the aircraft to maintain in the emergency descent;
categorize potential hazards in the vicinity of the aircraft by assigning a level of risk to each potential hazard, wherein the potential hazards comprise:
other aircraft;
weather;
time above 10,000 feet;
estimated time to an alternate;
terrain; and
special use areas;
identify a flight path, which either avoids the potential hazards or which represents the lowest level of risk in view of the potential hazards;
transmit a message conveying the initializing of the emergency descent by at least one of the methods selected from the group consisting of:
an automated voice message;
a 7700 squawk and ident; and
a data link electronic message;
configure the aircraft for the emergency descent; and
command the aircraft to fly the airspeed and the flight path by the autopilot until a crewmember disengages the autopilot.

* * * * *